2,974,132
PURIFICATION OF POLYETHYLENE WITH ALKYLENE OXIDES

Bernhard Jacobi, deceased, late of Marl, Kreis Recklinghausen, Germany, by Margarete Jacobi, Irmgard Jacobi, Walter Jacobi, and Robert Jacobi, heirs, all of Marl, Kreis Recklinghausen, Germany, and Oswald Wolff, Marl, Kreis Recklinghausen, Germany, assignors to Chemische Werke Hüls Aktiengesellschaft, Marl, Kreis Recklinghausen, Germany, a corporation of Germany No Drawing. Filed Oct. 29, 1956, Ser. No. 619,082

Claims priority, application Germany Nov. 19, 1955

1 Claim. (Cl. 260—94.9)

The so-called low-pressure polyolefines usually contain impurities, such as metal compounds, derived from the catalysts used in their production, which impurities cause difficulties in their working up and use. Such low-pressure polyolefines, as is well known, are made by polymerization of olefines such as ethylene at low pressure and temperature in the presence of polymerization catalysts which are compounds of metals of the fourth to sixth groups of the periodic system such as thorium and uranium associated with aluminum metal, aluminum hydride or organic compounds of aluminum, magnesium, zinc or alkali metals or with alkali metals.

It has been proposed to purify the crude low-pressure polyolefines by treatment with anhydrous alcohols. However, this process is time-consuming and uses a considerable quantity of alcohol. It has been attempted also to remove the impurities by treating the crude low-pressure polyolefines with alcoholic or aqueous solutions of acids. However, particularly when a strong mineral acid is used it is adsorbed by the polyolefine and so tenaciously retained that it cannot be completely removed even by a protracted washing with water. Thus low-pressure polyolefines which have been purified by the use of acid tend to attack and corrode the processing machines, molds and tools used in working up the resins. If, instead of aqueous solutions of acids, one uses a complex-forming organic compound the above mentioned disadvantages may be avoided to a large extent but a protracted and troublesome refining operation is involved.

It has been discovered that crude low-pressure polyolefines advantageously may be processed if the suspension thereof produced by the polymerization is pretreated in a suitable diluting medium with a gaseous alkylene oxide and then further treated in the known manner. Ethylene oxide or propylene oxide is preferably used as the olefine oxide. In carrying out the pretreatment the olefine oxide in gaseous state is introduced into a suspension of the crude low-pressure polyolefine in any suitable medium. The required amount of the olefine oxide depends upon the type and quantity of polymerization catalyst which has been used in the production of the crude polymer. In general 1.1 to 1.5 mols of the olefine oxide is introduced for each reactive group present in the catalyst.

Suitable diluting media are those used for the polymerization such as the aliphatic and hydro aromatic hydrocarbons containing from 4 to 12 carbon atoms.

The working up of the suspension of the low-pressure polyolefine which has been pre-treated with gaseous olefine oxide may be carried out in the known manner, for example, by treatment with an anhydrous alcohol or with an alcoholic or aqueous solution of an acid or with an aqueous solution of a complex-forming organic compound or with an oxygen-containing organic compound in which all of the oxygen valences are bound to carbon atoms. These treating agents together with the impurities or compounds formed by reaction of the treating agents with the impurities are removed from the polymer by washing with water which may be used at room temperature or elevated temperature. By this process, after the washing with water and drying, low-pressure polyolefines readily are obtained which contain less than 0.005% of ash. The treatment of the crude low-pressure polyolefines subsequent to their treatment with olefine oxide, as described, involves less expense, due to the employment of less treating material and time, than the treatment of low-pressure polyolefines which have not had the olefine oxide pre-treatment.

The invention is further described and illustrated in the following specific example.

Example

A suspension of a crude low-pressure polyethylene in an aliphatic hydrocarbon mixture having a boiling range of from 0 to 160° C., said suspension having been produced by the low-pressure polymerization of ethylene in the presence of aluminum-triisobutyl and titanium tetrachloride and containing 200 parts by weight of polyethylene, 3.5 parts by weight of titanium tetrachloride and 5 parts by weight of aluminum triisobutyl and their reaction products per 1000 parts by weight of the suspension, is treated by a slow introduction of ethylene oxide for 60 minutes at a temperature of 40° C. until the initial red-brown color of the suspension is bleached. About 9 parts by weight of ethylene oxide are required for this treatment. The low-pressure polyethylene is then separated from associated liquid and washed with 600 parts by weight of acetone while protecting the polyethylene against contact with atmospheric oxygen and moisture by means of a blanket of nitrogen gas. Finally the acetone is removed from the polyethylene by washing with water, the water is separated and the polyethylene is dried. Thus there are obtained 200 parts by weight of a snow-white polyethylene product having an ash content of less than 0.005%.

We claim:

A process for the purification of a crude polyethylene polymerizate, obtained by contacting ethylene in a liquid aliphatic hydrocarbon reaction medium with a catalyst consisting essentially of triisobutyl aluminum and titanium tetrachloride under polymerizing conditions, which comprises contacting said crude polymerizate with an alkylene oxide selected from the group consisting of ethylene oxide and propylene oxide in order to deactivate said catalyst and then separating solid polyethylene from said polymerizate.

References Cited in the file of this patent

FOREIGN PATENTS 614,594     Great Britain _____ Dec. 17, 1948